(12) United States Patent
Sandberg

(10) Patent No.: US 12,060,916 B2
(45) Date of Patent: Aug. 13, 2024

(54) DISK BRAKE

(71) Applicant: Haldex Brake Products AB, Landskrona (SE)

(72) Inventor: Stefan Sandberg, Lomma (SE)

(73) Assignee: Haldex Brake Products AB, Landskrona (SE)

( * ) Notice: Subject to any disclaimer, the term of this patent is extended or adjusted under 35 U.S.C. 154(b) by 574 days.

(21) Appl. No.: 17/286,805

(22) PCT Filed: Oct. 21, 2019

(86) PCT No.: PCT/EP2019/078588
§ 371 (c)(1),
(2) Date: Apr. 19, 2021

(87) PCT Pub. No.: WO2020/079279
PCT Pub. Date: Apr. 23, 2020

(65) Prior Publication Data
US 2021/0341025 A1    Nov. 4, 2021

(30) Foreign Application Priority Data
Oct. 19, 2018    (DE) ........................ 102018126120.9

(51) Int. Cl.
| F16D 65/56 | (2006.01) |
| F16D 55/22 | (2006.01) |
| F16D 65/18 | (2006.01) |
| F16D 55/226 | (2006.01) |
| F16D 121/14 | (2012.01) |
| F16D 125/28 | (2012.01) |
| F16D 125/40 | (2012.01) |
| F16D 127/02 | (2012.01) |

(52) U.S. Cl.
CPC .......... *F16D 65/567* (2013.01); *F16D 65/18* (2013.01); *F16D 55/226* (2013.01); *F16D 2121/14* (2013.01); *F16D 2125/28* (2013.01); *F16D 2125/40* (2013.01); *F16D 2127/02* (2013.01)

(58) Field of Classification Search
CPC ...... F16D 65/567; F16D 65/18; F16D 55/226; F16D 2125/28; F16D 2125/40; F16D 2121/14; F16D 2127/02
USPC ............ 188/71.8, 71.9, 196 R, 196 F, 196 P, 188/196 D
See application file for complete search history.

(56) References Cited

U.S. PATENT DOCUMENTS

| 4,351,419 | A | * | 9/1982 | Garrett | .................... F16D 65/56 |
| | | | | | 192/111.11 |
| 6,158,295 | A | * | 12/2000 | Nielsen | ............... F16H 25/2454 |
| | | | | | 192/223.4 |
| 10,066,692 | B2 | * | 9/2018 | Sandberg | .............. F16D 66/026 |
| 2017/0122394 | A1 | * | 5/2017 | Sandberg | .............. F16D 65/567 |

FOREIGN PATENT DOCUMENTS

| WO | 2011113554 A2 | 9/2011 |
| WO | 2013083857 A2 | 6/2013 |
| WO | 2014106672 A1 | 7/2014 |
| WO | 2015140225 A2 | 9/2015 |
| WO | 2018015565 A1 | 1/2018 |

* cited by examiner

*Primary Examiner* — Thomas J Williams
(74) *Attorney, Agent, or Firm* — Price Heneveld LLP

(57) ABSTRACT

The present invention relates to a brake actuating mechanism for a disc brake having an optimized adjusting device.

4 Claims, 4 Drawing Sheets

DISK BRAKE

FIELD OF THE INVENTION

The present invention concerns a disc brake, in particular for commercial vehicles, having an optimized brake actuation mechanism.

BACKGROUND OF THE INVENTION

The invention covers disc brakes which have either a sliding caliper or a fixed caliper and which overlap one or more brake discs. The invention relates mainly, but not exclusively, to spot-type disc brakes.

Disc brakes, in particular for heavy load vehicles, are known in many different forms, both in terms of the type of brake actuation mechanism, the way in which the braking force is transmitted to one or more brake discs and the type of adjustment to compensate for brake pad wear.

A special version of a brake actuation device used in disc brakes is known, for example, from the applicant's International Application WO 2011/113554 A2. The brake actuation mechanism known from that application is characterized by an extremely compact design which requires less space in the housing of the brake caliper and is lighter. All the components of that brake actuation mechanism are mounted in the brake caliper by means of a rod mounted in the housing of the brake caliper in an axial direction so as to interact functionally in such a way that they act parallel to the axis of rotation of the brake disc. As a result of a displacement movement of the amplification mechanism, a thrust element together with an adjusting device executes a translatory movement in the direction of the brake disc in order to transmit the clamping force.

The adjusting device for compensating wear has a torque clutch which is torque-controlled and serves to selectively transmit rotation between components of the torque clutch depending on the direction of rotation. In addition, the adjusting device also has a one-way clutch, in which two elements rotatably mounted on the rod, an inner receiving sleeve and a hollow shaft are connected to each other by means of a freewheel spring, the one-way clutch being designed in such a way that it transmits a rotational movement between the two elements during brake actuation, while it slips when the brake is released.

With regard to the exact functioning of the brake actuation mechanism known from the state of the art in terms of feed and transmission of the braking force and the adjusting movement, explicit reference is hereby made to the disclosure content of WO 2011/113554 A2. Other similarly designed brake actuation mechanisms are known, for example, from WO 2013/083857 A2, WO 2014/106672 A2, WO 2015/140225 A2 or WO 2018/015565 A2 of the applicant, to the disclosure of which explicit reference is also made herewith.

From this prior art, the use of one or more freewheel springs in an adjusting device of the brake actuating mechanism is basically known, which are designed as wrap springs or coil spring devices. On the one hand, they are used as a one-way clutch that connects two parts of the adjustment mechanism for the purpose of adjustment and/or rotation locking in one direction of rotation, but allows them to rotate relative to each other in the opposite direction with an almost ignorable torque resistance. On the other hand, another application is to provide such wrap springs in the adjusting mechanism as torque limiters with an increased radial preload to allow relative rotation between two parts in the non-locking direction of the wrap spring only above a considerable torque, which allows the end of free movement of the brake pads during brake application and thus the actual clearance between the brake pad and the brake disc to be determined.

For example, in the brake actuation mechanism described in the above-mentioned Int. patent application WO 2015/140225 A2, an adjustment device is provided to compensate for lining wear, in which a torque limiter is realized as a roller-ramp clutch and a one-way clutch is realized as a wrap spring device. The one-way clutch transmits rotation when the brake is applied for wear adjustment, but slips when the brake is reset or released and then transmits no rotation. This slip on brake release is essential to prevent unwanted reverse rotation of the adjusting spindle, which would otherwise affect wear adjustment.

In such an adjusting device, undesired reverse rotation of the adjustment spindle can be counteracted by increased friction, e.g. in the thread contact between the adjustment spindle and the thrust piece in threaded engagement with it, but with the problem that sometimes too much friction is caused, which could possibly restrict the adjustment spindle's rotation when the brake is applied. To solve this problem, therefore, WO 2015/140225 A2 proposed to provide an additional friction device comprising a spring-loaded friction element acting on the adjusting screw or on a part fixed thereto for rotation. Such additional friction elements usually provide a well controlled and controllable torque resistance due to the defined spring preload. Nevertheless, there may be a need to further minimize the influence of frictional fluctuations or to minimize them entirely.

For example, it is generally known that friction is greater at the start of a sliding process between two components or surfaces than during a subsequent further sliding process; likewise, it can be greater after a long period of standstill than after a short standstill period. Such excessive friction conditions can occur despite a constant spring preload force. When the brake is applied, excessive friction limits the adjustment rotation and causes excessive torque loading, thereby reducing the service life of the components in the adjustment mechanism, e.g. of the above-mentioned one-way clutch.

In the embodiment of the adjuster described in the above-mentioned Int. patent application WO 2018/015565 A2, a torque limiter is implemented by providing a coil spring or wrap spring device with an increased radial preload and a one-way clutch also designed as a wrap spring. In addition, a third freewheel spring or wrap spring device is provided, which is designed and arranged within the adjuster in such a way as to prevent undesired backward rotation of the adjustment spindle when the brake is released. Unwanted forward rotation of the adjusting spindle when the brake is in a released condition is prevented by a sliding bearing ring compressed by the return spring. This allows sliding at a certain torque between the torque limiter connected to the adjusting spindle and the return spring connected to the central rod fixed in the axial direction. An essential effect of the sliding ring is that the friction prevailing there substantially prevents the forward rotation of the adjusting spindle possibly induced by vehicle vibrations, which would otherwise bring the brake lining into contact with the rotating brake disc, which can then lead to overheating of the brake.

In fact, however, the sliding bearing ring of the adjusting mechanism of WO 2018/015565 A2 may have similar disadvantages as the additional friction device in the adjusting mechanism of WO 2015/140225 A2. For example, friction variations can sometimes cause a high resistance to the adjustment rotation when the brake is applied, resulting in excessive torque loading, which in turn is associated with a reduced service life of the components in the adjustment mechanism, in particular the one-way clutch.

SUMMARY OF THE INVENTION

Based on the above-described disadvantages in connection with such adjusting devices for disc brakes in the prior art, it is an object of the present invention to realize a properly and faultlessly functioning adjustment of the lining wear, in particular for such designs of adjusting devices, and in this connection to provide an optimized adjusting device for disc brakes, in particular of the type described above.

This object is solved with a disc brake according to claim 1. Advantageous further developments of the invention result from the dependent claims.

Accordingly, the invention relates to a disc brake having a brake caliper straddling at least one brake disc and a brake actuating mechanism comprising:
- an amplification mechanism for introducing a clamping force,
- an adjusting mechanism for compensating for pad wear having a torque clutch,
- a thrust element for transmitting the clamping force to the brake disc, the thrust element comprising an adjustment spindle threadedly engaged with a thrust piece cooperating with a brake pad, the thrust piece being axially and non-rotatably guided in the housing of the brake caliper such that rotation of the adjustment spindle results in axial displacement of the thrust piece, the adjustment spindle being operable by the adjustment mechanism, and
- a resetting device,
- wherein the amplification mechanism, the adjusting mechanism, the thrust element and the resetting device are mounted in a functionally cooperating manner by means of a rod in the brake caliper, which rod is supported in the housing of the brake caliper in a non-movable and non-rotatable manner in the axial direction, and
- wherein at least one means is provided which is designed to be inactive during the adjustment process during the braking process and to provide a defined resisting torque against rotation of the adjustment spindle when the brake is released and/or in the released state of the brake.

According to the invention, the means shall be designed in such a way that this resisting torque occurs in addition to a resisting or frictional torque exerted by components already provided or implemented in the adjusting mechanism, such as one or more freewheel spring(s) already present and acting as one-way clutches and/or torque limiters. In particular, the means is intended to be designed to increase the friction in the adjusting mechanism, preferably between two components of the adjusting mechanism that are movable or rotatable relative to each other, by a defined amount or friction torque. In other words, the means according to the invention applies an additional friction in the system.

According to a preferred embodiment of the invention, this means is designed as a freewheel spring or wrap spring, which is designed such that its free-wheeling action acts when the brake is applied and its locking action acts when the brake is released and/or in the released state of the disc brake.

The present invention essentially proposes a new use of a wrap spring device in a brake adjuster, which may already include one or more wrap spring devices for the above purposes. The provision of a further coil or wrap spring device prevents unwanted rotation of the adjustment spindle when the brake is released and/or in the released state of the brake. In these situations, unwanted rotation may be caused by friction in the non-locking direction of a one-way clutch in the adjuster itself, or by vehicle vibration, or a combination thereof.

The at least one additional wrap spring proves to be advantageous for this purpose compared to the devices already present in the adjustment mechanisms for applying a friction or resistance torque according to the state of the art described above, as it is able to exert a torque limitation that can be determined much more precisely. As a result, temporary torque peaks can be avoided, e.g. at the sliding start of the adjustment process during brake actuation. It is known that such torque peaks in the adjustment mechanisms of the prior art described above can, under certain circumstances, lead to high loads and thus shortened service life of essential components of the adjusting device, such as the one-way clutch.

According to one embodiment of the invention, the wrap spring can be coupled indirectly or directly to the adjustment spindle. In particular, the wrap spring couples a sleeve to the adjustment spindle, the sleeve being rotatably mounted radially on the inside of the adjustment spindle. Preferably, the sleeve may be coupled to the resetting device in a rotationally fixed manner. In this embodiment, the sole purpose is to prevent undesired spindle rotation by the one-way clutch provided by means of the wrap spring when the brake is released.

According to a further embodiment of the invention, the wrap spring may be coupled indirectly or directly to the adjustment mechanism. Preferably, the wrap spring couples the resetting device to the adjustment mechanism and, in particular, the wrap spring couples the return spring to the adjustment mechanism with the interposition of a ball bearing. This embodiment is preferably intended to counteract undesirable rotation of the adjustment spindle due to vehicle vibrations.

BRIEF DESCRIPTION OF THE DRAWINGS

Further advantages and features of the invention will be apparent from the following description of the embodiments illustrated with reference to the drawings, in which.

DETAILED DESCRIPTION OF THE INVENTION

Figure 1:
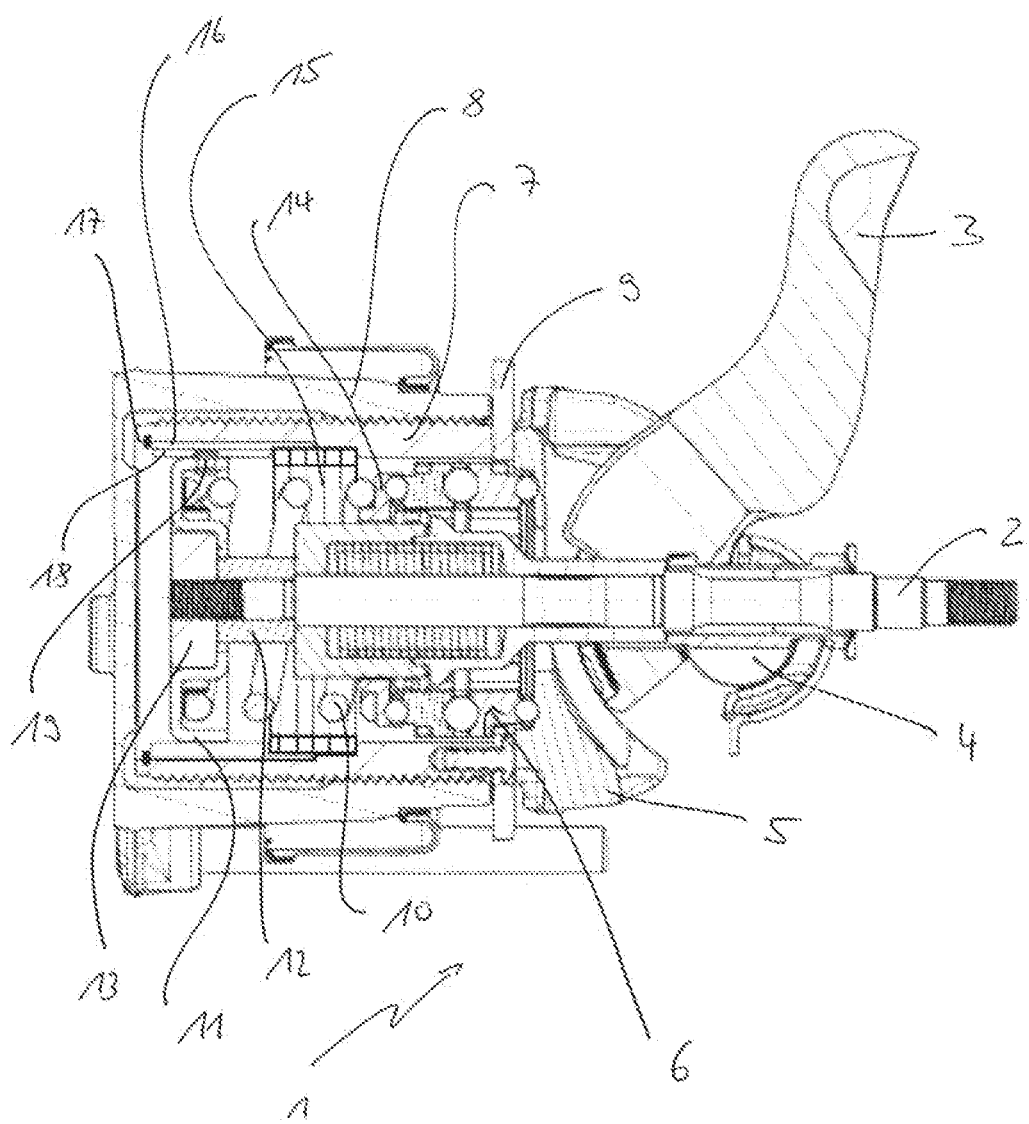
FIG. 1 shows a first embodiment of a brake actuating mechanism according to the invention.

FIG. 1 shows a first embodiment of a brake actuating mechanism 1 for a disc brake according to the invention. In principle, the brake actuating mechanism 1 corresponds conceptually to that of FIG. 2 of the applicant's Int. patent application WO 2015/140225 A2. With regard to the structure and mode of operation of the adjusting device shown there, reference shall be made to the disclosure content of WO 2015/140225 A2, to which reference is hereby expressly made.

The brake actuating mechanism 1 consists essentially of an amplification mechanism which introduces the actuator force originating from a hydraulic, pneumatic or electromechanical actuator (not shown here) into the brake actuating mechanism 1 as a clamping force and in so doing boosts it in accordance with a transmission ratio predetermined by the design, an adjusting device which serves to compensate for brake lining wear, a thrust element which transmits the increased clamping force to the brake disc, and a resetting device in order to return the brake actuating mechanism 1 to its initial position when no more braking force acts via the actuator, which is located outside the housing of the brake caliper.

An essential feature of the disc brake or brake actuating mechanism according to the invention in this respect is that the aforementioned assemblies are arranged on a central rod 2 which is aligned coaxially with the axis of the brake disc. The rod 2 serves as a mounting means for the individual assemblies of the brake actuating mechanism 1, on the one hand, and as a fastening means for the latter in the housing of the brake caliper, on the other hand.

The amplification mechanism has a lever 3 on which, for example, a rod of a pneumatic cylinder engages. The lever 3 is pivotably mounted in a rear housing section (not shown) of the brake caliper in that it is rotatably supported on eccentric rollers 4, the lever 3 being designed and configured relative to the eccentric rollers 4 in such a way that a pivoting movement about the eccentric rollers 4 results in an eccentric displacement of the lever 3 relative to the eccentric rollers 4, which leads to an amplification of the force introduced into the lever 3 by the actuator.

Opposite the eccentric rollers 4, the lever 3 is supported by a force transmission element 5. On the brake disc side, the force transmission element 5 is designed with flat surfaces to interact with the adjusting device and thus with the thrust element.

Immediately adjacent to the amplification mechanism in the direction towards the brake disc is the adjusting device.

The adjusting device includes a torque clutch 6, which is designed as a roller-ramp mechanism. For the precise mode of operation of the torque clutch 6, reference is made to the disclosure content of WO 2015/140225 A2.

The thrust element has a hollow adjustment spindle 7, which engages on the outside with a thrust piece 8 via a corresponding thread. The end face of the hollow adjustment spindle 7 facing away from the brake disc is connected in a rotationally fixed manner to a gearwheel 9 of the adjusting device via corresponding connecting elements, the gearwheel being connected to a mechanism not shown for manual resetting in the event of a pad change. The gearwheel 9 in turn is connected to the ramp body of the roller-ramp clutch via a splines connection in a rotationally fixed manner. As a result, a rotary movement of the ramp body is indirectly transmitted to the adjustment spindle 7. In this regard, reference should also be made to the disclosure content of WO 2015/140225 A2.

The resetting device is connected to the adjusting device in the axial direction towards the brake disc and is also arranged coaxially to the rod 2.

It consists of a helical spring 10 which is supported on the brake disc side against an abutment shell 11.

The abutment shell 11 is axially positioned and fastened in the region of the end of the rod 2 on the brake disc side on the one hand via a spacer ring 12 and on the other hand via a fastening nut 13 which comes into contact with the spacer ring 12 and can be screwed onto a corresponding thread on the end of the rod 2 on the brake disc side, the abutment shell 11, however, having a through-opening with such a diameter or at least with such a clearance that the abutment shell 11 is basically rotatably mounted on the spacer ring 12.

On its opposite side, the helical spring 10 is supported on an intermediate ring 14 of the adjusting device. In this way, the resetting device can simultaneously function as a mechanism for applying a torque limitation to the adjusting device; in this regard, express reference should be made to the disclosure content of WO 2011/113554 A2.

As can be seen in FIG. 1, the rod 2 has a corresponding contouring with different diameters and groove arrangements in order to provide the bearing surfaces and mounting means for the axial positioning of the individual assemblies described above. Here, the rod 2 on the one side and the individual components of the amplification mechanism, the adjusting device and the resetting device mounted on it on the other side are dimensioned and designed in the axial direction in such a way that, in the installed state of the rod 2 braced in the rear part of the brake caliper, the helical spring 10 exerts a defined torque limitation via a permanent preload then realized on the torque clutch present in the adjusting device in the form of a roller-ramp mechanism 6.

According to the invention, an additional freewheel or wrap spring 15 is provided, which engages radially on the inside of the adjustment spindle 7.

A sleeve 16 is rotatably mounted in a radially circumferential recess of the adjustment spindle 10, which opens at the front towards the brake disc and is held in the axial direction by means of a locking ring 17.

The sleeve 16 has a groove 18. The abutment shell 11 has a rivet-shaped guide or connecting element 19, which is slidably guided in the groove 18. In this way, the abutment shell 11 can be connected to the sleeve 16 in a rotationally fixed manner and thus to the adjustment spindle 7 via the freewheel spring 15, so that the abutment shell 11 can rotate with the adjustment spindle 7 while at the same time allowing relative axial displacement between these elements. As a result of the fact that the abutment shell 11 for the helical spring 10 is supported on the fastening nut 13, with the helical spring 10 exerting a defined axial spring force via its predefined spring properties, a defined frictional resistance is generated between the fastening nut 13 and the abutment shell 11, which is then transmitted via the connecting element 19 to the sleeve 16 and then in turn via the wrap spring 15 to the hollow spindle 7.

In order to avoid the effects explained in connection with the prior art, which may occur in the course of excessive friction during brake application in this embodiment, the invention proposes the arrangement of the wrap spring 15 in such a way that it consequently operates in its non-locking direction during adjustment when the brake is applied.

It is known that the frictional torque of a wrap spring depends mainly on the bending pretension of the winding wire during assembly, and the friction between the sliding surfaces is almost negligible. When the brake is released, this device operates in the locking direction and stops unwanted reverse rotation of the adjustment spindle.

In principle, however, the ability of a reverse rotation is retained to such an extent that is required for a manual reset of the adjusting mechanism.

According to the invention, the additional wrap spring 15 thus acts as an intermediate element between the abutment shell 11 and the adjustment spindle 7, providing a very constant torque resistance.

Figure 2:
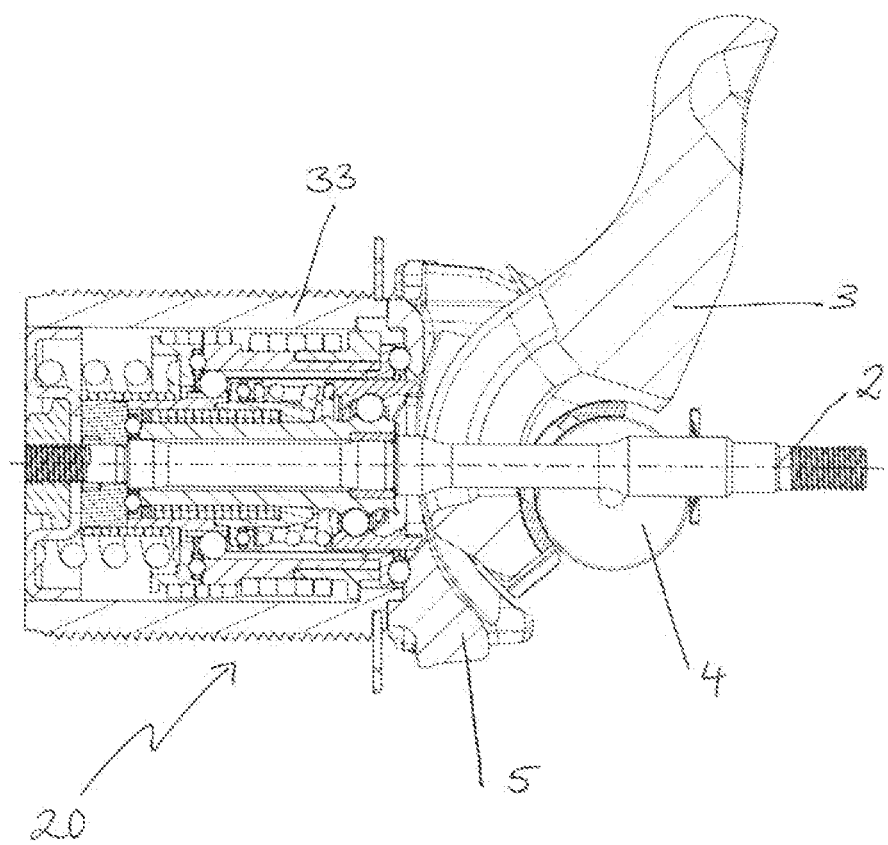
FIG. 2 shows a second embodiment of a brake actuating mechanism according to the invention.
Figure 3:
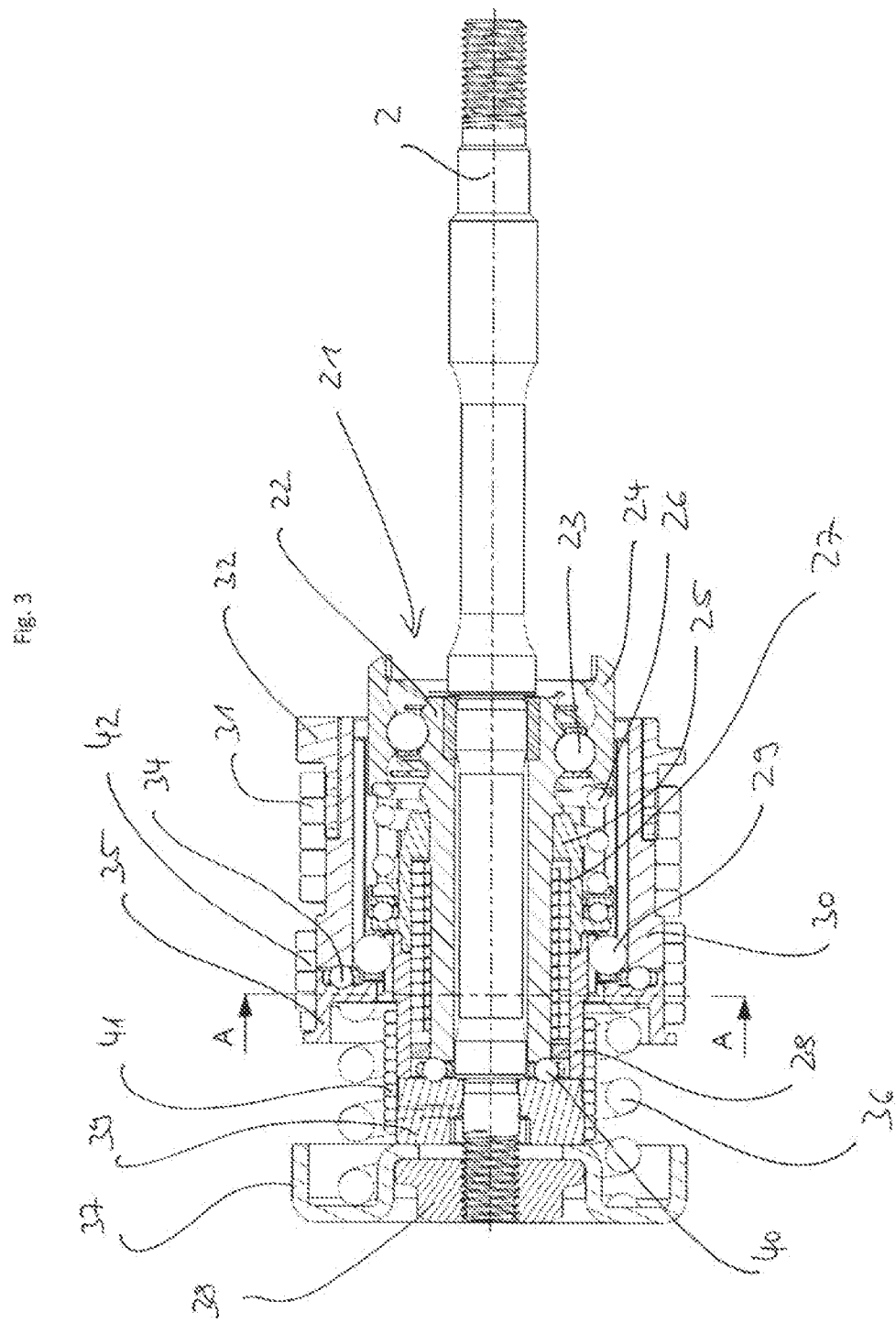
FIG. 3 is an enlarged view of the adjuster mechanism of FIG. 2.
Figure 4:
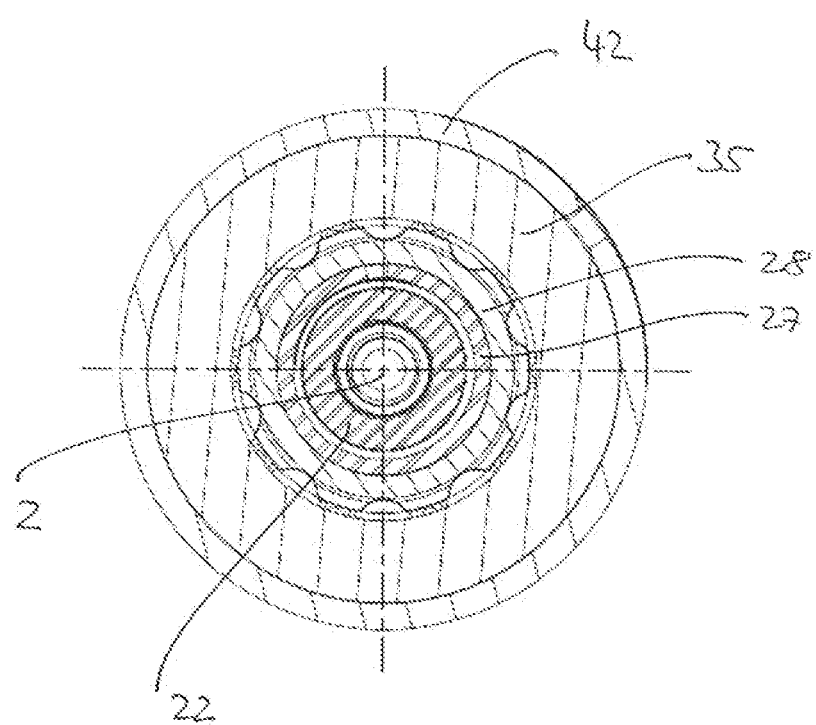
FIG. 4 is a cross-sectional view along A-A of FIG. 3.

FIGS. 2 to 4 show a second adjusting device according to the invention, in which an additional wrap spring offering a defined friction is provided as well.

The brake actuating mechanism 20 shown in these FIGS. 2 to 4, or the adjusting device implemented there, are almost identical in terms of structure and mode of operation to those of FIG. 1 of the applicant's Int. patent application WO 2018/015565 A2, the disclosure content of which is expressly referred to herein.

Seen in the axial direction with respect to a brake disc (not shown here), the adjusting device follows directly after the bearing seat body or the force transmission element 5 and comprises a ball screw 21. The ball screw 21 has a hollow spindle 22, which is divided into a threaded section facing away from the brake disc and facing the bearing seat body 5 and a cylindrical section facing the brake disc. The threaded section is connected via balls 23 to a nut 24 that radially surrounds the threaded section and forms the drive element of the ball screw 21. At the same time, the hollow spindle 22 as the output element of the ball screw 21 forms the input element for the adjusting device; for further understanding, reference should also be made to the disclosure content of WO 2018/015565 A2.

A coupling sleeve 25 is arranged on the hollow spindle 22 in the region of the cylindrical section, which coupling sleeve 25 is connected to the hollow spindle 22 in a rotationally fixed manner via an interference fit. The coupling sleeve 25 comprises a circumferential flange ring on which a spring 26 is supported.

The coupling sleeve 25 is coupled to a radial bearing hub 28 via a first freewheel spring 27. The coupling sleeve 25 and the radial bearing hub 28 radially enclose the first freewheel spring 27 and thus form a first torque clutch.

The radial bearing hub 28 is in torque-transmitting connection with a front torque sleeve 30 via a radial bearing 29. The radial bearing hub 28 comprises longitudinal grooves and the front torque sleeve 30 comprises corresponding longitudinal grooves between which the balls of the radial bearing 29 are mounted, so that torque transmission is provided with simultaneous axial displaceability between these elements.

Forming a second torque clutch, the front torque sleeve 30 is connected to a rear torque sleeve 32 via a second freewheel spring 31. The rear torque sleeve 32 comprises radial projections which engage in corresponding recesses of an adjustment spindle 33.

On the side facing the brake disc, a ball bearing 34 is provided on the front torque sleeve 30, which is enclosed by a retaining ring 35.

A spring 36 of the resetting device comes into contact with the retaining ring 35. The return spring 36, which is designed as a helical spring, is in turn supported on an abutment shell 37, which is fastened to the end of the rod 2 facing the brake disc by means of a fastening nut 38. The abutment shell 37 is clamped between an abutment ring 39 and the fastening nut 38.

The hollow spindle 22 is in turn supported on the abutment ring 39 via an axial bearing 40 in a rotatable bearing arrangement which absorbs the forces acting axially on the hollow spindle 22.

Forming a third torque clutch, the abutment ring 39 is coupled to the radial bearing hub 28 via a third freewheel spring 41, which radially externally encloses these components.

During a brake application, when a translational movement of the bearing seat body 5 causes the hollow spindle 22 to rotate via the ball screw 21, the first freewheel spring 27 of the first torque clutch locks the coupling sleeve 25 with the radial bearing hub 28. The rotation is then transmitted correspondingly to the front torque sleeve 30 via the radial bearing 29. The correspondingly largely designed second freewheel spring 31 of the second torque clutch slips during the actuation stroke as a function of the torque defined by this and thus limits the torque with respect to the rear torque sleeve 32, which is coupled in a rotationally fixed manner to the adjustment spindle 33.

The rotation of the front torque sleeve 30 causes the return spring 36 to wind up over the ball bearing 34 and the retaining ring 35, i.e., to twist on itself, and to be compressed because the frictional engagement between the return spring 36 and the retaining ring 35 is large enough to prevent slippage between the end of the return spring 36 and the retaining ring 35.

During brake release, i.e. when no more clamping force is transmitted, the spring 26 causes the nut 24 to follow the backward movement of the bearing seat body 5. In this process, the hollow spindle 22 is rotated back to its original position.

Furthermore, the return spring 36 is unwind again or stretches, causing the front torque sleeve 30 to rotate in the opposite direction of rotation via the retaining ring 35 and another wrap spring 42. In this direction of rotation, the second freewheel spring 31 of correspondingly large dimensions couples the front torque sleeve 30 with the rear torque sleeve 32.

However, the extent of this rotation is limited in that the third freewheel spring 41 of the third torque clutch brakes the rotation of the radial bearing hub 28, so to speak, i.e. limits the extent of the rotation of the radial bearing hub 28 in accordance with the dimension to be adjusted. This limited rotation or limited rotations is/are then transmitted via the radial bearing 29 to the front torque sleeve 30 and thus then to the rear torque sleeve 32, since in this direction of rotation the two torque sleeves 30 and 32 are coupled via the second freewheel spring 31. The return spring 36 stops unwinding or stretching as soon as the third freewheel spring 41 locks. The third freewheel spring 41 virtually opposes the coupling by the second freewheel spring 31 with a defined resistance, which determines the dimension to be adjusted during each braking stroke. Finally, this rotation, which is subject to resistance from the third freewheel spring 41, is transmitted from the rear torque sleeve 32 via the torsionally rigid coupling to the adjustment spindle 33, which, due to the torsionally rigid guidance of the thrust piece and due to the threaded engagement, results in a corresponding adjustment of the clearance.

The additional wrap spring 42 provided in accordance with the invention is designed to be active in its non-blocking direction during adjustment while the brake is applied.

The ball bearing 34 has a frictional torque that can be effectively ignored. Thus, the total torque resistance between the front torque sleeve 30 and the retaining ring 35 is provided by the wrap spring 42, and can be kept very constant in the process due to the defined properties of the wrap spring 42, since the torque resistance depends mainly on the bending preload of the wrap spring wire during assembly and is almost negligible from the friction between its sliding surfaces.

The invention claimed is:

1. A disc brake having a brake caliper straddling at least one brake disc and a brake actuating mechanism, comprising:
    an amplification mechanism for introducing a clamping force;
    an adjusting mechanism for compensating for pad wear having a torque clutch;
    a thrust element for transmitting the clamping force to the brake disc, the thrust element comprising an adjustment spindle threadedly engaged with a thrust piece cooperating with a brake pad, the thrust piece being axially and non-rotatably guided in a housing of the brake caliper such that rotation of the adjustment spindle results in axial displacement of the thrust piece, the adjustment spindle being operable by the adjusting mechanism;
    a resetting device, wherein the amplification mechanism, the adjusting mechanism, the thrust element and the resetting device are mounted in a functionally cooperating manner via a rod in the brake caliper, which rod is supported in the housing of the brake caliper in a non-movable and non-rotatable manner in the axial direction;
    at least one resistance element configured to be inactive during an adjustment process when the brake is applied and to provide a defined resisting torque against rotation of the adjustment spindle when the brake is released and/or in the released state of the brake;
    wherein the resistance element comprises a wrap spring which is such that a freewheeling of the resistance element acts when the brake is applied and a locking action of the resistance element acts when the brake is released and/or in the released state;
    wherein the wrap spring is coupled directly or indirectly to the adjustment spindle; and
    wherein the wrap spring couples a sleeve to the adjustment spindle, the sleeve being received radially inwardly in the adjustment spindle.

2. The disc brake of claim 1, in which the sleeve is coupled to the resetting device in a rotationally fixed manner.

3. A disc brake having a brake caliper straddling at least one brake disc and a brake actuating mechanism, comprising:
    an amplification mechanism for introducing a clamping force;
    an adjusting mechanism for compensating for pad wear having a torque clutch;
    a thrust element for transmitting the clamping force to the brake disc, the thrust element comprising an adjustment spindle threadedly engaged with a thrust piece cooperating with a brake pad, the thrust piece being axially and non-rotatably guided in a housing of the brake caliper such that rotation of the adjustment spindle results in axial displacement of the thrust piece, the adjustment spindle being operable by the adjusting mechanism; and
    a resetting device, wherein the amplification mechanism, the adjusting mechanism, the thrust element and the resetting device are mounted in a functionally cooperating manner via a rod in the brake caliper, which rod is supported in the housing of the brake caliper in a non-movable and non-rotatable manner in the axial direction;
    at least one resistance element configured to be inactive during an adjustment process when the brake is applied and to provide a defined resisting torque against rotation of the adjustment spindle when the brake is released and/or in the released state of the brake;
    wherein the resistance element is configured to increase friction between individual components of the adjusting mechanism by a defined amount;
    wherein the resistance element includes a wrap spring coupled directly or indirectly to the adjusting mechanism; and
    wherein the wrap spring couples the resetting device to the adjusting device.

4. The disc brake of claim 3, in which the wrap spring couples a return spring to the adjusting device with a ball bearing interposed therebetween.

* * * * *